US008544044B2

(12) United States Patent
Friedlander et al.

(10) Patent No.: US 8,544,044 B2
(45) Date of Patent: *Sep. 24, 2013

(54) UP NEXT VIDEO GUIDE FOR TV VIDEO PLAYER

(75) Inventors: Steven Friedlander, San Diego, CA (US); Seth Hill, La Mesa, CA (US); Hyehoon Yi, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1273 days.

This patent is subject to a terminal disclaimer.

(21) Appl. No.: 12/020,052

(22) Filed: Jan. 25, 2008

(65) Prior Publication Data

US 2009/0193464 A1    Jul. 30, 2009

(51) Int. Cl.
*H04N 5/445* (2011.01)

(52) U.S. Cl.
USPC .......................................................... 725/51

(58) Field of Classification Search
USPC ..................................... 725/37–46
See application file for complete search history.

(56) References Cited

U.S. PATENT DOCUMENTS

| 7,546,621 B2* | 6/2009 | LaJoie et al. ..................... 725/39 |
| 7,650,618 B2* | 1/2010 | Swix et al. ....................... 725/38 |
| 2006/0267995 A1* | 11/2006 | Radloff et al. ................. 345/530 |
| 2007/0107015 A1* | 5/2007 | Kazama et al. .................. 725/58 |
| 2008/0007616 A1* | 1/2008 | Baladhandayuthapani ................... 348/14.12 |
| 2008/0092170 A1* | 4/2008 | Shannon et al. ................ 725/46 |
| 2008/0098425 A1* | 4/2008 | Welch ............................. 725/37 |
| 2008/0148152 A1* | 6/2008 | Blinnikka et al. ............ 715/719 |

OTHER PUBLICATIONS

"Breaking New Ground at M1 Kylv". Integrated Broadcast Information Systems Ltd, http://www.ibistv.com/uploads/documents/M1_Kyiv04.pdf, 2005.

* cited by examiner

*Primary Examiner* — Vivek Srivastava
*Assistant Examiner* — Anthony Bantamoi
(74) *Attorney, Agent, or Firm* — John L. Rogitz; John M. Rogitz

(57) ABSTRACT

An Internet TV shows which video clip in an Internet-provided playlist of multiple clips is "up next" for play.

12 Claims, 4 Drawing Sheets

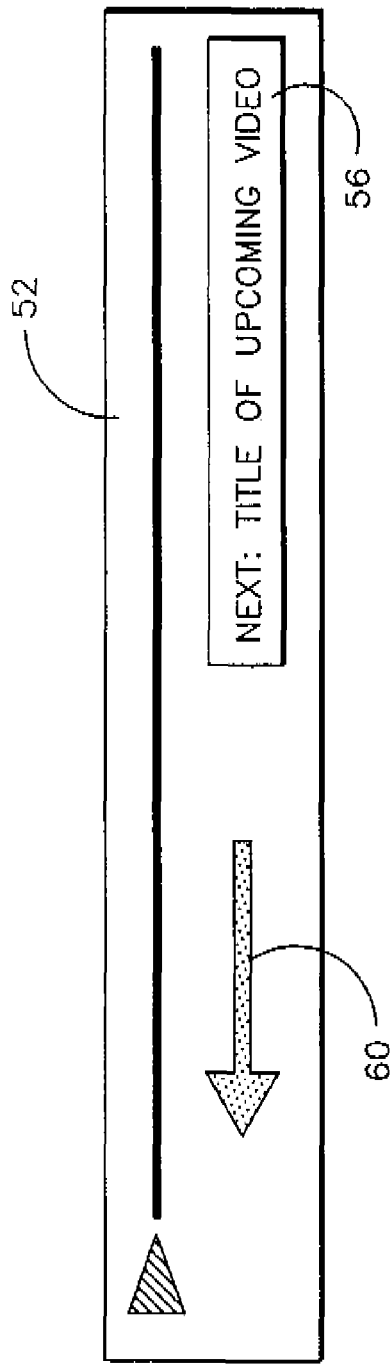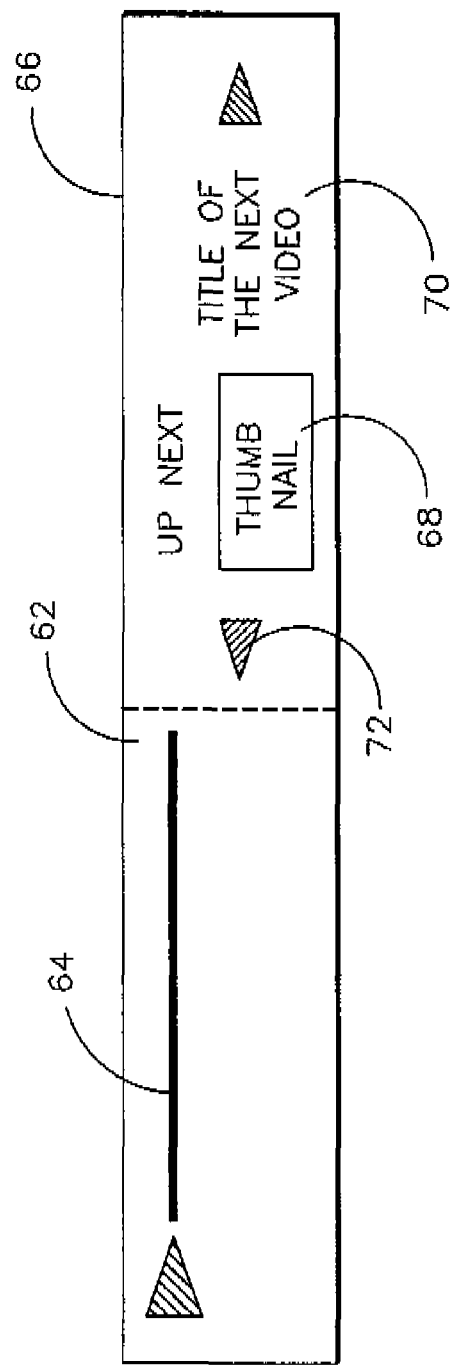

UP NEXT VIDEO GUIDE FOR TV VIDEO PLAYER

FIELD OF THE INVENTION

The present invention relates generally to players used for conveying Internet video to TVs for display thereof and to indicating which video programs from such players are scheduled for the next time slot.

BACKGROUND OF THE INVENTION

Televisions have become increasingly advanced, providing viewers with ever more control and viewing options. As but one example, electronic program guides (EPG) can be displayed on a TV in response to a command generated by a remote control device, with the EPG showing a channel listing and show descriptions. As another example, a video player for providing Internet video for display on a TV can be provided, and these players typically involve additional control features and functionalities.

Additional TV features and functions may also be provided, and as understood herein, many if not most of these features and functions entail presenting a user interface on screen to enable a viewer to select or control the feature or function. As also understood herein, owing to the growing number of such features and functions and the operational complexity that can attend to managing them, the user interfaces preferably are displayed in an intuitive, easy to understand format that keeps screen clutter and, hence, viewer confusion to a minimum.

SUMMARY OF THE INVENTION

A method includes receiving, at a TV, signals from the Internet, and based on the signals, presenting on the TV a video guide. The video guide includes a graphic entity representing a playlist receivable from the Internet and having at least two video clips. The graphic entity is selectable to cause a first video clip from the playlist to be played on the TV. An indicator is also displayed on the TV to indicate a title of a second video clip in the playlist that, e.g., can immediately follow the first clip in the playlist and that, if desired, can be automatically displayed on the TV as soon as the first clip ends.

In some embodiments the indicator can also indicate a title of the first clip. Further, if desired the indicator may present a timeline indicating time remaining in play of a current clip. When the first clip finishes playing, the title of the second clip can be made to move on the TV to a location formerly occupied by the title of the first clip.

In another aspect, a TV is disclosed with a TV processor and TV display An Internet adapter that is configured for communicating with the TV using HDMI is configured to receive signals from the Internet, and the TV processor and/or the adapter processor is configured for displaying an indication of which video clip in an Internet-provided playlist of multiple clips is "up next" for play.

In another aspect, an Internet TV shows which video clip in an Internet-provided playlist of multiple clips is "up next" for play.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 is a bottom portion of a screen shot indicating how the title of the "up next" clip can slide left; and FIG. 5 is a bottom portion of another screen shot that can be used in lieu of FIG. 3.

DETAILED DESCRIPTION OF THE PREFERRED EMBODIMENT

Figure 1:
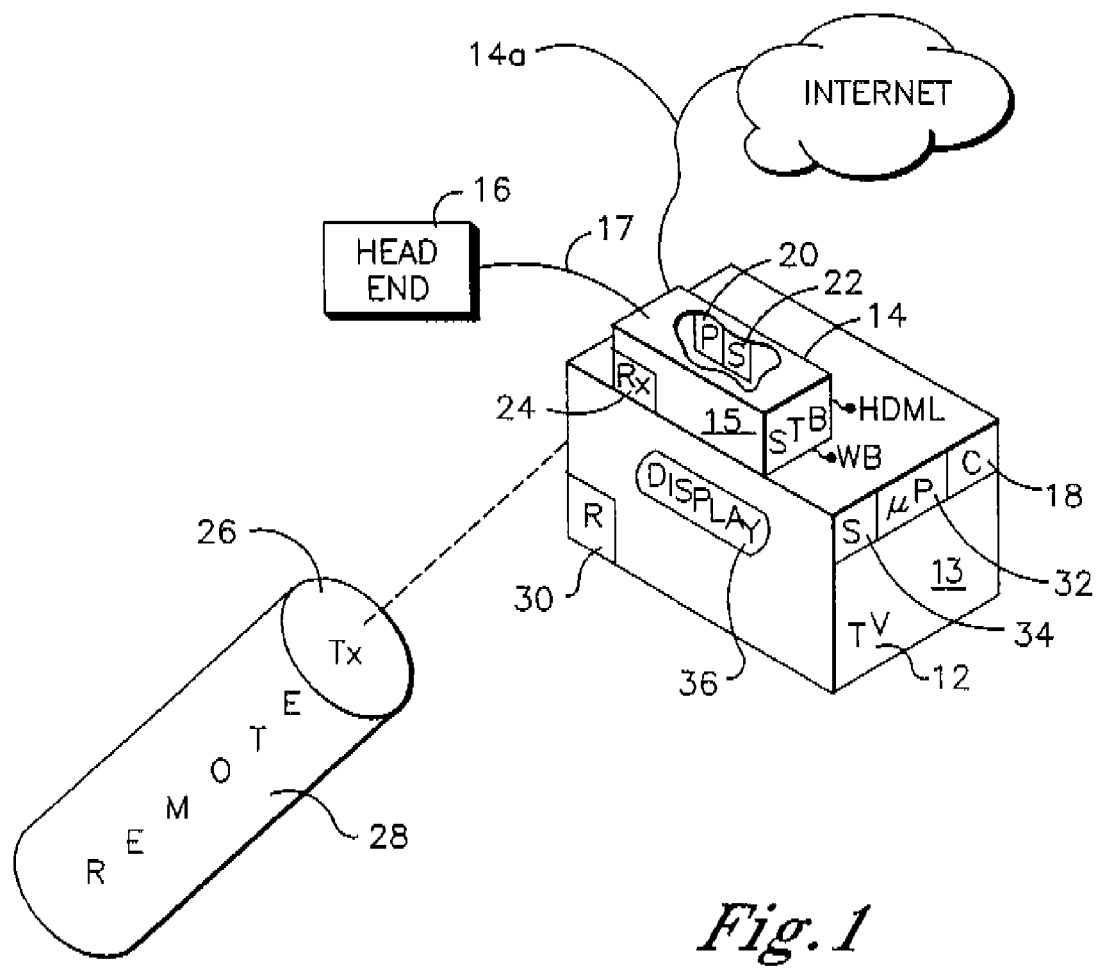
FIG. 1 is a non-limiting hardware block diagram of a system in accordance with present principles, with portions of the STB and TV cut away for clarity.

Referring initially to FIG. 1, a system is shown, generally designated 10, which includes a television 12 defining a TV chassis 13 and receiving, via a set-top box (STB) 14 defining a STB housing 15, audio video TV programming from a head-end 16, such as a cable or satellite head-end, over a wired or wireless link 17. The STB 14 and TV 12 are examples of receivers. "Set-top box" also includes set-back boxes. While the STB 14 is shown separately housed from the chassis 18 of the TV 12, it is to be understood that the functionality of the STB 14 may be incorporated into the chassis 18.

In any case, the STB 14 may be connected to the TV 12 by both a high definition multimedia interface (HDMI) connector "HDMI" and by a universal serial bus (USB) connector "USB". The STB 14 may also be connected to the Internet as shown via a wired or wireless communication path 14a. In one implementation the path 14a includes an Ethernet cable. The STB 14 conveys video programs from Internet sites to the TV 12 for display of the video programs on the TV 12 as described further below.

As shown, the STB 14 includes a STB processor 20 and a tangible computer readable medium 22 such as volatile or non-volatile solid state storage, disk storage, tape storage, or other type of electronic storage medium or logic circuitry that typically can be executed by the processor 20. The STB 14 typically includes a wireless receiver such as an infrared (IR) receiver 24 for receiving channel, volume, and other commands from a hand-held wireless transceiver 26 on a TV remote control 28. The receiver 24 communicates with the STB processor 20. Likewise, a TV wireless receiver 30 may be provided on the TV housing and may communicate with the TV processor discussed below for sending commands from the remote control 28 to the TV processor.

Additionally, as shown the TV 12 typically includes a TV processor 32 and tangible computer readable medium 34. Video as well as the below-described user interfaces may be presented on a display 36 of the TV 12, e.g., a flat panel matrix display, cathode ray tube, or other appropriate video display.

Either one or both of the above-described processors may execute instructions stored in either one or both of the above-described tangible computer readable media to undertake logic below. The tangible computer readable media may be established by, without limitation, solid state storage, optical or hard disk storage, tape storage, etc.

Figure 2:
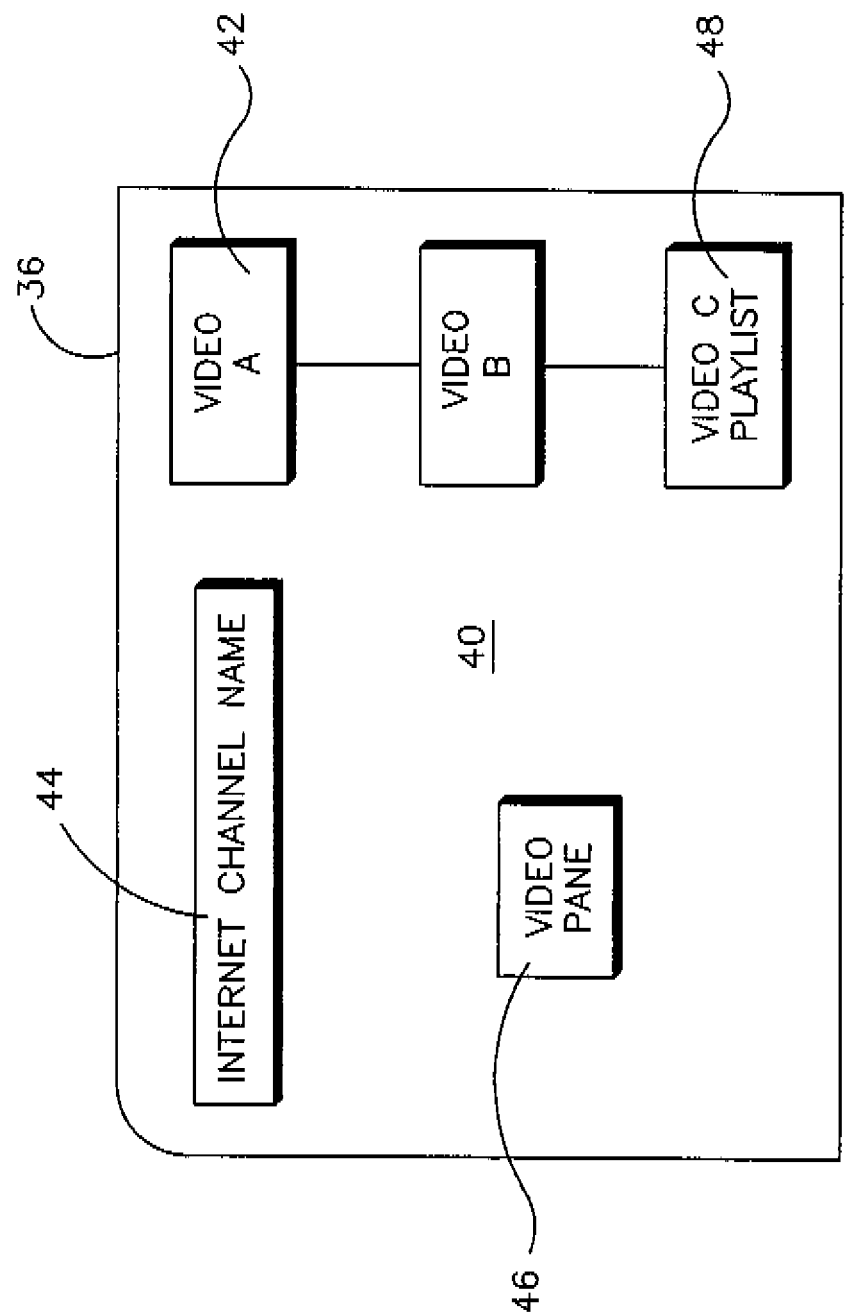
FIG. 2 is a screen shot showing an Internet TV video guide in accordance with one embodiment.

Now referring to FIG. 2, when the STB 14 is connected as intended to the TV 12, a video guide 40 appears automatically or in response to a user manipulating a key on the remote control 28 such as a "guide" or "menu" key. The video guide 40 shows thumbnails and/or titles 42 of respective Internet video streams that may be provided through the STB 14 to the TV 12 via, e.g., the above-described HDMI path for display of the Internet videos on the TV 12. Videos from all available video providers may be represented by thumbnails 42. In FIG. 2, for ease of disclosure a single video provider is indicated at 44. If desired, a video pane 46 may also be presented on the video guide 40 to display a currently tuned-to TV or Internet video.

Typically, each thumbnail 42 represents a respective single "asset" such as a single video stream, and a viewer can place a cursor over a desired thumbnail and select it to cause the associated video stream to be played on the TV 12. However, an Internet video provider may elect to provide a video asset that itself consists of two or more video streams, referred to herein for clarity as "clips", in a playlist format. Such an asset is shown at 48 in FIG. 2, indicating that the asset is a playlist of plural clips as shown. In this way, an Internet video provider can bundle multiple video clips under one title, with the set of videos appearing on the video guide as one entity to, e.g., support advertisement insertion.

Figure 3:
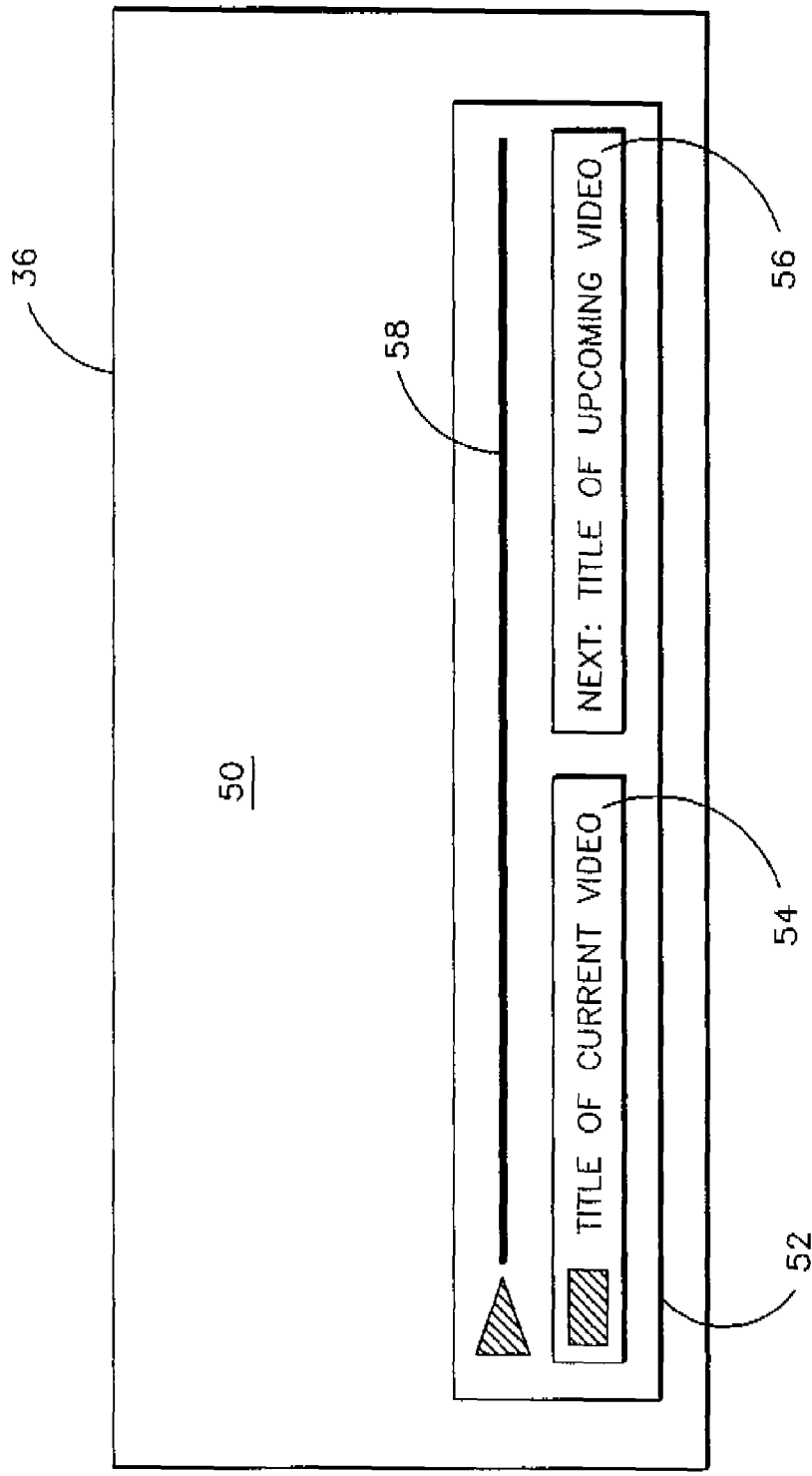
FIG. 3 is a screen shot showing an Internet TV video guide after selection of a playlist thumbnail.

Accordingly, should a viewer use the remote control 28 to select the playlist thumbnail 48 (by, e.g., hovering the screen cursor over it), the display can change to that shown in FIG. 3, in which the clip can be played in the area 50 of the display 36.

In accordance with present principles, juxtaposed with, e.g., below, the area 50 an "up next" indicator 52 can be displayed. The indicator 52 can include a "current" clip pane 54 indicating the title of the clip being currently played in the area 50. The "current" pane 54 may bear not only the title but an indicator such as the phrase "now on" or "current" or other advisement that the title in the pane 54 is that of the clip being played in the area 50.

Additionally, the indicator 52 can include an "up next" clip pane 56 indicating the title of the clip that is next in the playlist asset represented by the thumbnail 48. As was the case with the "current" pane 54, the "up next" pane 56 can, if desired, bear not only the title of the next clip in the playlist but also an indicator such as the phrase "upcoming" or "next" or other advisement that the title in the pane 56 is that of the clip that will be played next in the playlist. While only a single "up next" pane is shown, it is to be understood that if the playlist includes more than two clips, plural "up next" panes indicating the title and order of the clips may be presented side by side.

The determination of which titles to display in the up next pane(s) may be made by, e.g., scanning video header information in the playlist for title fields, with two or more title fields being inferred to indicate a playlist and with the titles inferred to indicate the names of the clips in the playlists. Or, an Internet video provider may append or set a predetermined "playlist" flag on an asset that represents a playlist to in effect explicitly tell the STB 14/TV 12 that an asset is a playlist, along with the titles of the clips in the playlist.

As also shown in FIG. 3, a timeline 58 can be presented as an elongated bar to indicate the time remaining in the play of the current clip. The timeline 58 can start unshaded and then as the clip plays, shading can be correspondingly continuously grown starting at, e.g., the left end of the timeline and moving right, with the timeline arriving at a completely shaded appearance just as the clip finishes.

Moving to FIG. 4 which is scoped for clarity of disclosure to show only the part of the display 36 presenting the indicator 52, when the current clip finishes playing, the "up next" clip can immediately and automatically start. Concurrent with this, the "current clip" pane 54 may be faded from the display and the "up next" pane 56 displayed to slide horizontally to the left as indicated by the arrow 60 to occupy the screen position formerly held by the "current" pane 54 in FIG. 3.

Concurrent with this graphic action, the label of the pane 56 can change from "up next" to "current" or similar advisement, and if another clip follows in the playlist, its title can be presented in a new "up next" pane to in effect reestablish the screen shown in FIG. 3, albeit with updated titles in the panes 54, 56.

FIG. 5 shows that alternative presentations can be made in the clip panes of the present invention. For example, an indicator 62 may include a timeline 64 and an "up next" pane 66 in which a thumbnail 68 of the next clip in the playlist is displayed along with, if desired, the title 70 of the clip. Up-list and down-list navigation arrows 72 may also be provided in the pane 66 as shown, and a viewer can manipulate the remote control 28 to select the arrows as desired to scroll through the playlist, with thumbnail and title of the currently scrolled-to clip being displayed in the pane 66.

While the particular UP NEXT VIDEO GUIDE FOR TV VIDEO PLAYER is herein shown and described in detail, it is to be understood that the subject matter which is encompassed by the present invention is limited only by the claims.

What is claimed is:

1. A TV system comprising:
    a TV;
    a TV processor in the TV;
    a TV display associated with the TV and configured for communicating with the TV processor;
    an Internet adapter configured for communicating with the TV using at least a high definition multimedia interface (HDMI) communication path, the Internet adapter configured to receive signals from the Internet;
    an adapter processor in the adapter;
    the TV processor and/or the adapter processor configured for causing an indication of a video clip in an Internet-provided playlist of multiple clips is "up next" for play, wherein the processor scans video header information in the playlist for title fields, the processor determining, responsive to detecting with two or more title fields in the video header information of the playlist, that the playlist is a playlist and that names of clips in the playlist are indicated by respective title fields in the video header information of the playlist.

2. The system of claim 1, wherein the indication indicates at least a title of an "up next" video clip in the playlist, an indication of a title of a currently displayed clip also being presented on the TV display.

3. The system of claim 1, wherein a timeline indicating time remaining in play of a current clip is presented on the TV display.

4. The system of claim 2, wherein when the currently displayed clip finishes playing, the indication of the clip that is "up next" moves on the TV display.

5. The system of claim 1, wherein a thumbnail of the clip that is "up next" is displayed.

6. The system of claim 1, wherein up-list and down-list navigation arrows are displayed to enable a viewer to scroll through the playlist.

7. A video display device (VDD) comprising:
    a processor;
    a configured for communicating with the processor, wherein an Internet adapter configured for communicating with the processor using at least a communication path can receive a playlist of multiple video clips from the Internet, a playlist being characterized by having multiple video clips, and provide the playlist to the processor;
    the processor being configured to access a computer readable storage medium bearing instructions to configure the processor for causing a first video clip in the playlist to be displayed on the display along with a title of a second clip in the playlist, wherein the processor when accessing the instructions is configured to present on the display plural thumbnails each representing a single asset, an asset represented by a first thumbnail being a single video stream, an asset represented by a second thumbnail being a playlist including two or more video clips associated with one playlist title, with the two or more video clips appearing as one entity, a thumbnail being selectable by a user to cause the respective asset to be played on the display, wherein the processor when accessing the instructions is configured to scan video header information in the playlist for title fields, the processor when accessing the instructions being configured for determining, responsive to detecting with two or more title fields in the video header information of the playlist, that the playlist is a playlist and that names of clips in the playlist are indicated by respective title fields in the video header information of the playlist.

8. The VDD of claim 7, wherein the second clip is automatically displayed on the display as soon as the first clip ends.

9. The VDD of claim 7, wherein a title of the first clip is also indicated on the display.

10. The VDD of claim 9, wherein when the first clip finishes playing, the title of the second clip moves on the display to a location formerly occupied by the title of the first clip.

11. The VDD of claim 7, wherein a thumbnail of the second clip is displayed.

12. The VDD of claim 7, wherein up-list and down-list navigation arrows to enable a viewer to scroll through the playlist are displayed on the display.

* * * * *